US012104356B2

(12) United States Patent
Hahn et al.

(10) Patent No.: US 12,104,356 B2
(45) Date of Patent: Oct. 1, 2024

(54) MOBILE WORK MACHINE AND METHOD FOR OPERATING A MACHINE OF THIS TYPE

(71) Applicant: LIEBHERR-MINING EQUIPMENT COLMAR SAS, Colmar (FR)

(72) Inventors: Philipp Hahn, Turckheim (FR); Alexis Leroy, Colmar (FR)

(73) Assignee: LIEBHERR-MINING EQUIPMENT COLMAR SAS, Colmar (FR)

( * ) Notice: Subject to any disclaimer, the term of this patent is extended or adjusted under 35 U.S.C. 154(b) by 441 days.

(21) Appl. No.: 17/426,067

(22) PCT Filed: Jan. 28, 2020

(86) PCT No.: PCT/EP2020/052007
§ 371 (c)(1),
(2) Date: Jul. 27, 2021

(87) PCT Pub. No.: WO2020/157046
PCT Pub. Date: Aug. 6, 2020

(65) Prior Publication Data
US 2022/0098829 A1  Mar. 31, 2022

(30) Foreign Application Priority Data
Jan. 28, 2019 (DE) ............... 10 2019 101 990.7

(51) Int. Cl.
*B60W 10/06* (2006.01)
*E02F 9/20* (2006.01)
(Continued)

(52) U.S. Cl.
CPC .......... *E02F 9/2066* (2013.01); *E02F 9/2246* (2013.01); *F02D 29/04* (2013.01);
(Continued)

(58) Field of Classification Search
CPC ...... E02F 9/2066; E02F 9/2246; F02D 29/04; F02D 31/001; F02D 41/021;
(Continued)

(56) References Cited

U.S. PATENT DOCUMENTS 6,192,839 B1 *  2/2001  Takeshita ............... F01P 11/12
                                                                165/41
6,234,254 B1    5/2001  Dietz et al.
(Continued)

FOREIGN PATENT DOCUMENTS

DE    112006002935 B4    9/2013
DE    112013002969 T5    3/2015
(Continued)

OTHER PUBLICATIONS

ISA European Patent Office, International Search Report Issued in Application No. PCT/EP2020/052007, Apr. 3, 2020, WIPO, 2 pages.

*Primary Examiner* — Shardul D Patel
(74) *Attorney, Agent, or Firm* — McCoy Russell LLP

(57) ABSTRACT

The present invention relates to a mobile work machine, in particular a hydraulic excavator, which comprises an engine for driving the mobile work machine, a hydraulic power generation unit which is coupled to the engine and is designed to convey a hydraulic volume in a manner which is dependent on a rotational speed of the engine, and a plurality of hydraulic elements which can be actuated by way of the conveyed volume of the hydraulic power generation unit and are assigned to various functions of the mobile work machine. The machine is characterized by a control unit for detecting a defined operating mode of the
(Continued)

mobile work machine, wherein the control unit is designed to set the setpoint rotational speed of the engine in a manner which is dependent on the detected defined operating mode.

20 Claims, 4 Drawing Sheets

(51) Int. Cl.
*E02F 9/22* (2006.01)
*F02D 29/04* (2006.01)
*F02D 31/00* (2006.01)
*F02D 41/02* (2006.01)

(52) U.S. Cl.
CPC ......... *F02D 31/001* (2013.01); *F02D 41/021* (2013.01); *F02D 2200/101* (2013.01)

(58) Field of Classification Search
CPC .......... F02D 2200/101; F02D 41/0205; B60W 10/06; G05D 2201/00
USPC .......................................................... 701/50
See application file for complete search history.

(56) References Cited

U.S. PATENT DOCUMENTS

| | | | |
|---|---|---|---|
| 6,672,055 B1* | 1/2004 | Konishi | F04B 49/08 |
| | | | 60/449 |
| 7,752,511 B2* | 7/2010 | Fulton | G05B 19/058 |
| | | | 714/725 |
| 8,538,645 B2 | 9/2013 | Anderson et al. | |
| 2006/0113140 A1* | 6/2006 | Nakamura | F02D 41/021 |
| | | | 180/306 |
| 2013/0319786 A1* | 12/2013 | Kikuchi | F28F 27/00 |
| | | | 165/281 |
| 2018/0119391 A1* | 5/2018 | Kondo | F02D 41/3005 |
| 2018/0338059 A1* | 11/2018 | Ohigashi | E02F 9/2066 |

FOREIGN PATENT DOCUMENTS

| | | |
|---|---|---|
| DE | 112016000049 T5 | 10/2017 |
| DE | 102017206713 A1 | 10/2018 |
| EP | 1154162 A1 | 11/2001 |
| EP | 1650418 A1 | 4/2006 |
| WO | 2018162138 A1 | 9/2018 |

* cited by examiner

MOBILE WORK MACHINE AND METHOD FOR OPERATING A MACHINE OF THIS TYPE

CROSS REFERENCE TO RELATED APPLICATIONS

The present application is a U.S. National Phase of International Application No. PCT/EP2020/052007 entitled "MOBILE WORK MACHINE AND METHOD FOR OPERATING A MACHINE OF THIS TYPE," and filed on Jan. 28, 2020. International Application No. PCT/EP2020/052007 claims priority to German Patent Application No. 10 2019 101 990.7 filed on Jan. 28, 2019. The entire contents of each of the above-listed applications are hereby incorporated by reference for all purposes.

TECHNICAL FIELD

The present invention relates to a mobile work machine, in particular to a hydraulic excavator, and to a method of operating same.

BACKGROUND AND SUMMARY

With current mobile hydraulic work machines (e.g. hydraulic excavators for surface mining use), the drive takes place via a diesel engine at a constantly regulated output speed. As a rule, this engine drives a transfer case on which hydraulic pumps are arranged. A transfer of the hydraulic power takes place onto the corresponding outputs, that can be hydraulic cylinders and/or hydraulic motors, by the control of the hydraulic fluid flow that is generated by the pumps.

Different, mostly cyclic work is carried out on the basis of the use of the mobile work machines. This inter alia includes (by way of example with reference to an excavator) digging, driving, work preparation, lifting, and rotating. Different power requirements are present during these phases whose adaptation takes place as a rule by the control of the hydraulics. Depending on the hydraulic control concept, more or fewer losses are produced here that are determined by the control principle, on the one hand, but also by friction losses in lines and efficiencies of the components, on the other hand. These losses reduce the total efficiency of the machine and additional cooling power has to be applied due to the conversion into heat.

There are currently approaches in the prior art that pursue the dynamic adaptation of the power of a diesel engine of the mobile work machine on the basis of the required output power. The speed of the diesel engine is observed for this purpose. If the engine is exposed to load and if the speed falls below a limit value, the performance map is adapted via the injection such that a higher torque and thus a higher output power can be achieved at a low speed (cf. DE 11 2016 000 049 T5). Different engine performance maps are used for the deployment of an engine in this respect that are selected in dependence on the required output power.

An approach is furthermore pursued in U.S. Pat. No. 8,538,645 B2 that compares the instantaneously required driving torque with the still available output torque of the diesel engine. If the difference falls below a threshold value, the speed of the diesel engine is increased and an increased output power is made possible. In parallel with this procedure, the adaptation of the gear ratio of a continuously variable transmission (CVT) takes place.

It is now the aim of this invention to provide an improved mobile work machine that enables a more energy efficient working and also lowers operating costs. This is done using a mobile work machine in accordance with claim 1 and by the method of actuating a mobile work machine in accordance with claim 10. Further advantageous embodiments can be found in the dependent claims.

Claim 1 describes a mobile work machine, in particular a hydraulic excavator, that comprises an engine for driving the mobile work machine, a hydraulic power generation unit that is coupled to the engine and that is adapted to convey a hydraulic volume in dependence on a speed of the engine, and a plurality of hydraulic elements that are actuable by the conveyed volume of the hydraulic power generation unit and are associated with different functions of the mobile work machine. The machine is characterized by a control device for recognizing a specific operating mode of the mobile work machine, with the control device being adapted to set the desired speed of the engine in dependence on the recognized specific operating mode.

The invention enables a variable adaptation of the speed of the engine, that is advantageously a diesel engine, in dependence on the instantaneously required hydraulic power in the respective work phase. The conveyed volume flow of the hydraulic power generation unit or of the hydraulic pumps, that is proportional to the drive speed, is adapted in accordance with the required power. Throttle and power losses are reduced by the decreased volume flow and the engine is operated in the region of better efficiencies with its operating map.

An improved overall efficiency of the machine and a reduced consumption of fuel is achieved by this adaptation of the drive speed of the power generation unit.

A further possibility comprises adapting the (diesel) engine speed such that only that volume flow is generated that is required in the corresponding operating mode of the machine. This approach should be looked at here. It was previously the case that the maximum available volume flow on the basis of the deployment of the machine and its different operating modes is typically not required. In the prior art, this results in increased power losses between the generation of the volume flow and the distribution thereof, on the one hand, and the non-required volume flow, on the other hand, has to be led off to a tank to generate a desired speed of the hydraulic elements. Avoidable losses are therefore generated and unnecessary hydraulic power is produced.

A determination or also a detailed analysis of the actuation of the machine is carried out in claim 1 that as a rule largely corresponds to fixed cyclic routines. The required hydraulic drive power and the associated required travel speed of the hydraulic elements can be determined by the analysis of these phases for every phase of a specific operation carried out by the mobile work machine. Based on this analysis, a corresponding output speed of the engine and the corresponding required drive power can now be determined that is required to generate the corresponding speeds for actuating the hydraulic elements. The limits due to the available power of the engine are preferably provided with a fixed map in this process.

Provision can thus be made that a constant desired speed is specified in the engine for driving a mobile work machine (in particular a hydraulic excavator for use in surface mining). An injection of fuel is carried out within the fixed engine map (speed over power) by the engine control so that the nominal power of the engine can be reached over a specific speed range.

If now only travel takes place with the excavator in a specific phase, this specific operating mode is recognized by the control device and the engine is operated at a different speed than would be the case when the mobile work machine is stationary at one position and, for example, only performs a digging movement with an excavator arm. The engine is adapted to the respectively recognized operating mode with respect to its desired speed. A high volume flow and a small power can, for example, be provided for the driving of the machine such that the operating point of the engine is operated along its characteristic line of power over torque when the speed is very high, with the power here being of secondary importance. It is different with a digging of an excavator since here a power has to be available by means of the excavator bucket that is as high as possible so that the latter can also penetrate into particularly hard ground. Since the piston stroke required for this and the accompanying volume flow required are evidently very much smaller than on the traveling of the excavator, it is now necessary to set the engine such that the volume flow of the power generation unit driven by it has maximum power, whereas the amount of the volume flow is of subordinate importance. It is therefore of advantage if the engine is operated in the "digging" operating mode at a speed that is close to or at the torque maximum of the engine.

Provision can further be made that the control device is adapted to analyze every actuation and/or internal control signal of the mobile work machine to draw a conclusion from the information thus recorded on the presence of a specific operating mode (digging, driving, pivoting of the superstructure, etc.).

Provision is made in accordance with an optional further development of the invention that the specific operating mode has a fixed cyclic procedure of an actuation sequence of the plurality of hydraulic elements and the control device is adapted to set the desired speed of the engine in dependence on the current cycle phase of the cyclic procedure during a recognized specific operating mode.

It is frequently the case that mobile work machines carry out cyclic actuation sequences of different work steps. It is, for example, typical for a hydraulic excavator that it loads soil onto a transporter in work deployment. A digging movement is here therefore first carried out with the bucket of the excavator, the filled bucket is raised, and the superstructure of the excavator is simultaneously rotated such that the filled bucket is above the transporter surface to be loaded. The loaded bucket is then emptied and the empty excavator bucket is subsequently pivoted back to carry out a further digging stroke in a spatially similar position to the first digging movement. The steps of this process are frequently repeated a large number of times and are only varied by slight variations. The excavator can thus be traveled into a better position before digging, but the general cyclic procedure of the process typically does not change.

If therefore such a cyclic sequence of an actuation sequence is recognized by the control device, the engine is adapted to the respective phase of the cycle with respect to its output speed.

Without intending to restrict the general applicability of the idea of the invention, an exemplary explanation for different phases in the operation of the machine is presented in the following. A high power is thus required for the digging movement, with a low speed of the engine being able to be selected with a high torque due to the manageable amount of required hydraulic fluid volume flow in this movement. The pivoting back of the superstructure rotation for digging does not act against any external resistances (such as the ground or the like). The cylinder movements (empty movements), however, require a larger volume flow of hydraulic fluid. It is therefore obvious here to place the focus on a higher speed in the engine map (for example torque over speed) so that sufficient volume flow is generated, with the required torque not having to have any maximum values. Analog considerations are made for every phase so that the optimum drive speed of the engine can be associated in each of them and the operation in uneconomic ranges of the engine is suppressed during such a phase. This results in considerable savings potential that can be achieved since the engine is operated at the optimum speed therefor in every phase. The requirement for this is naturally that the control device recognizes the current operation as a specific operating mode.

It can furthermore be of advantage in accordance with the present invention if the fixed cyclic routine of an actuation sequence comprises a plurality of cycle phases that can be associated with a work process of the machine, with the plurality of cycle phases of the work process preferably comprising digging, lifting, rotating, lifting and rotating, unloading, pivoting back, driving, and/or work preparation. It can thus be possible to recognize a switchover between the phases faster and to operate the mobile work machine even more efficiently since each phase of the cycle does not have to be recognized separately per se every time. It is already clear in advance with high probability which phase will follow as the next.

As already explained above, it is thereby possible to provide the matching optimum speed at the engine for each of the plurality of work procedures. That point can be selected in the corresponding map that is optimum with respect to the required volume flow of the hydraulic fluid per time and the required power. The losses incurred are thus reduced to a minimum.

Provision can be made in accordance with a further development of the invention that the functions of the machine with which at least one respective hydraulic element is associated comprise digging, lifting, rotating, unloading, pivoting, and/or driving.

A hydraulic element can here comprise a hydraulic cylinder or a hydraulic motor. A hydraulic cylinder is thus typically used for the moving of an excavator arm and a hydraulic motor for the traveling of an excavator, that are both actuated by the volume flow of the hydraulic power generation unit.

In accordance with the invention, a transfer case can be provided between the engine and the hydraulic power generation unit that is driven by the engine and that drives the hydraulic power generation unit, with the transfer case preferably having a fixed gear ratio.

The drive speed of the hydraulic power generation is proportional to the speed of the engine due to the drive of a transfer case that is typically used with a fixed gear ratio. Due to the drive of hydraulic motors or hydraulic cylinders with this volume flow, their adjustment speed is likewise also proportional to the output speed of the engine. The control of the speed of the hydraulic cylinders is as a rule carried out by a division of the volume flow delivered by the hydraulic power supply.

The configuration of the machine components as a rule takes place on the basis of a maximum desired movement speed of the hydraulic elements. On the one hand, this determines the gear ratio of the transfer case between the engine and the hydraulic power generation and, on the other hand, also the dimensioning of its maximum displacement volume.

Provision can preferably be made in accordance with the invention that the hydraulic power generation unit is a system for outputting a constant volume flow whose starting volume flow is preferably proportional to a drive speed of the hydraulic power generation unit.

Provision can furthermore be made that the hydraulic power generation unit has a dividing device to carry out an actuation speed of the plurality of hydraulic elements by a division of the starting volume flow, with a tank preferably being provided for receiving a starting volume flow not required for the supply to the plurality of hydraulic elements.

The dividing device can here conduct different amounts of the fluid flow generated by the power generation unit to different ones of the plurality of hydraulic elements to vary the actuation speed of the hydraulic elements. If the volume flow to be conducted to the hydraulic elements is smaller than the present volume flow output by the power generation unit, the non-required amount can be led back to a tank that serves as a reservoir for the power generation unit.

In accordance with an advantageous further development of the invention, the control device is further adapted to operate the engine at a nominal speed provided that a specific operating mode of the mobile work machine has not been recognized.

It is thus ensured that the mobile work machine holds its actual performance ready for non-recognized operating modes and permits an operation at its nominal output power.

The invention can preferably provide sensors for detecting a state of the different functions of the mobile work machine, with signals of the sensors being provided to the control device together with control signals for the machine to recognize a specific operating mode of the mobile work machine.

In this respect, the control signals can comprise all the internal and external signals for actuating the work machine that permit a conclusion on the operation of the work machine.

The conclusion can furthermore be drawn on an operating mode here in that the actuations of the machine carried out are compared with a set of known operating modes present in the control device and, if an agreement with one of them has been recognized, the engine is set to the operating point optimum for the recognized operating mode or the desired speed is adapted. The set of operating modes can be supplied externally to the control device or can also take place by an analysis of the previous actuations of the work machine by the control device itself. It is also conceivable that the operator of the work machine creates a specific operating mode in the control device via an input terminal. As a rule, the rather comprehensive set of different operating modes may, however, already be stored in a preset manner in the control device so that an analysis of the actuation of the machine or a recognition of a specific operating mode takes place without any intervention of the machine operator.

The invention further relates to a method of operating a mobile work machine, in particular a hydraulic excavator, wherein the actuation of the machine is checked for a specific operating mode in the method and, if such a specific operating mode has been recognized, the desired speed of the engine is set in dependence on the recognized specific operating mode, with the specific operating mode preferably having a fixed cyclic routine of an actuation sequence of a plurality of hydraulic elements of the machine.

In the operation of the machine, it is analyzed as to whether a known operating mode is carried out with it. These operating modes are preferably characterized by a specific pattern of actuations of the plurality of hydraulic elements or of only one hydraulic element and preferably permit a conclusion on a plurality of still following—typically cyclic—actuations of the machine to that the (diesel) engine is operated at a point of its map optimum therefor.

Provision can furthermore be made here that the motor is operated at a nominal speed after a start of the machine for so long until a specific operating mode has been recognized and the desired speed of the engine is set in dependence on the recognized specific operating mode and this state is maintained for so long until a different specific operating mode has been recognized so that the desired speed of the engine is set in dependence on the recognized other specific operating mode and/or a specific operating mode has no longer been recognized so that the nominal speed is set again.

After a start of the machine, the engine accordingly runs at its nominal speed so that sufficient power is present for demanding work that cannot be associated with any specific operating mode. Driving, digging, pivoting, pivoting back, work preparation of the mobile work machine, or the like can be considered as an operating mode here. A combination of said functions or a specific sequence can naturally also represent a specific operating mode. A typical case would, for example, be the lifting of an excavator arm and the simultaneous rotating of the superstructure.

The speed is only lowered or raised into an optimum region for a specific operating mode when said specific operating mode has been recognized so that an energetic efficiency gain can be implemented with respect to normal operation.

On the start of the machine, the diesel engine is operated at the nominal speed that corresponds to the speed at which the travel speed can be reached that serves as the basis for the configuration of the machine. If an operating mode is now recognized, that preferably takes place from an evaluation of sensor signals and control signals, with which a previously defined drive speed is associated, the desired speed of the engine is influenced accordingly. A change back to the nominal speed is made by a continuous monitoring of the work of the machine if no defined operating mode is recognized. It is hereby achieved that the machine can be operated at its nominal starting power on with a not previously defined or unrecognized operating mode.

Provision can preferably be made here that a specific operating mode of the machine is characterized by a fixed cyclic routine of an actuation sequence of a plurality of hydraulic elements of the machine, with the desired speed of the engine preferably being set in accordance with the current cycle phase of the cyclic routine during a recognized specific operating mode.

The speed is therefore set in dependence on the recognized operating mode such that the work phases carried out in the operating mode are carried out at a speed of the engine that is optimal for it.

In accordance with another further development of the method, the fixed cyclic routine of an actuation sequence comprises a plurality of cycle phases that are associated with a work procedure of the machine, with the plurality of cycle phases of the work procedure preferably comprising digging, lifting, rotating, lifting and rotating, unloading, pivoting back, traveling, and/or work preparation and a respective desired speed of the engine is associated with each cycle phase.

The invention also relates to a mobile work machine that is operated in accordance with one of the presented variants of the method and/or that is formed in accordance with one of the variants presented above at the apparatus side.

BRIEF DESCRIPTION OF THE FIGURES

Further features, details and advantages of the invention will become clear with reference to the following description of the Figures. There are shown.

DETAILED DESCRIPTION

Figure 1:
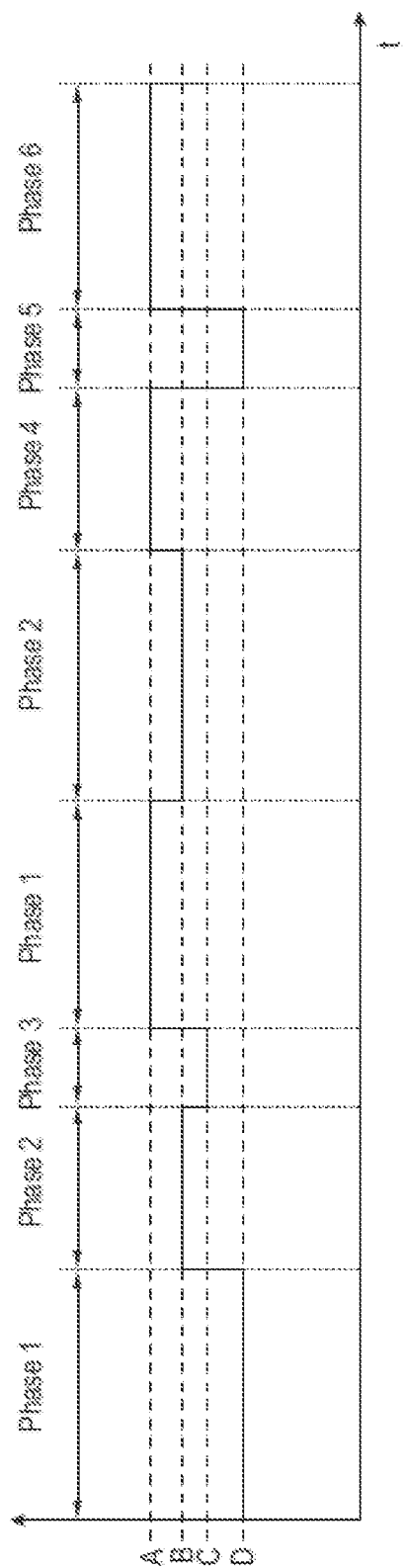
FIG. 1: the stringing together of a plurality of phases of a specific operating mode that is defined by different work procedures.

FIG. 1 shows a diagram in which a desired speed of the engine, preferably of the diesel engine, is entered over the time. Depending on the recognized work procedure of the mobile work machine, a desired speed of the engine suitable for it is set. The work procedures can here inter alia be "digging", "lifting and rotating", "unloading", "pivoting back", "driving", "work preparation", etc., with the invention naturally not being restricted thereto.

If the control device recognizes a specific operating mode, that is "digging", for example, in one of these phases, the required hydraulic drive power and the required travel speed of the hydraulic cylinders associated therewith are determined so that a corresponding output speed of the diesel engine (e.g. drive speed A, B, C, and D) and the corresponding required drive power that is required for the generation of the corresponding speeds can now be determined on the basis of this analysis or recognition. The limits are given here by the available power of the (diesel) engine with a fixed map.

Figure 2:
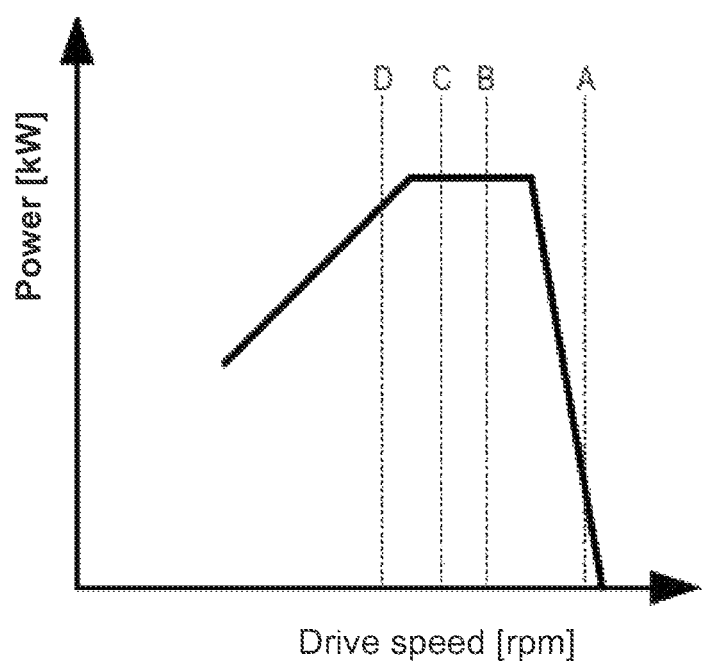
FIG. 2: the representation of an exemplary drive speed in an engine map of a diesel engine used to drive the machine.

The arrangement of exemplary drive speeds is shown in the engine map in FIG. 2 that are specified as the drive speed to the (diesel) engine in dependence on the cycle phase. Different sensors and control signals are monitored within the machine for the recognition of the cycle phase.

Phase 4 of FIG. 1 here shows a desired speed A that, as can be seen from FIG. 2, stands for a high speed of the engine at a small power. This speed is accordingly possible for a pivoting back of the superstructure of the machine since high amounts of a fluid volume flow are required for this purpose and the required power simultaneously does not have to be excessively high. This is different, for example, at speed C in phase 3; a mean speed, that therefore combines a mean volume flow and simultaneously a very high power of the conveyed volume flow, is applied here at a maximum power. This is suitable for power-intense work that simultaneously requires a mean volume flow of the fluid in the hydraulic elements. In phase 2 of FIG. 2, in contrast, a higher speed of the engine is set so that the work deployment carried out here requires a higher volume flow of hydraulic fluid than in phase 3, but does not reach the very high power of this phase. Finally, it can be seen from the map that the power at this point B is equal to the power at point C despite the higher speed of the engine so that the engine has to have a smaller torque at point B which in turn effects a smaller (pressure) power or displacement power of the volume flow. This is thus in turn also suitable for a very specific piece of work of the machine.

If therefore an operating mode such as digging, unloading, rotating back, or the like is recognized, the optimum speed of the engine for this is set.

Figure 3:
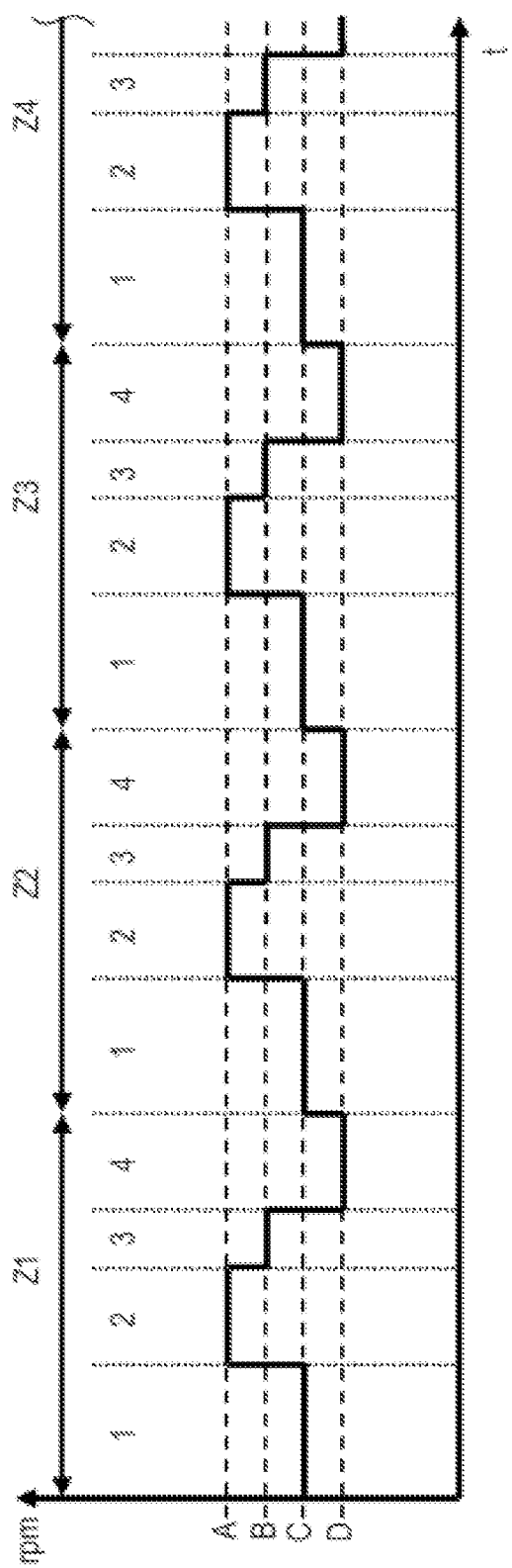
FIG. 3: a representation of the stringing together of cyclic work procedures.

FIG. 3 shows a change of the desired speed with a cyclically repeating piece of work that can be divided into a plurality of actuations of the machine.

FIG. 3 here has the identical designation of the coordinate axes as in FIG. 1 and shows a plurality of cycles $Z1$, $Z2$, $Z3$ of a cyclically carried out piece of work of the machine.

The same sequence of work is thus carried out by the machine in every cycle $Z1$, $Z2$, $Z3$. Digging is performed in phase 1, that is the bucket of an excavator is filled with soil, for example. The maximum power is required for this so that this is done at the speed C. A look at FIG. 2 shows that this speed of the engine delivers more power than the other speed values A, B, or D.

Subsequent to this, the superstructure is pivoted and the filled bucket is raised.

The bucket is opened in phase 3 and the soil therein is unloaded before the machine is again moved into a state directly before a repeat "digging" in phase 4. The cycle then begins from the start.

Figure 4:
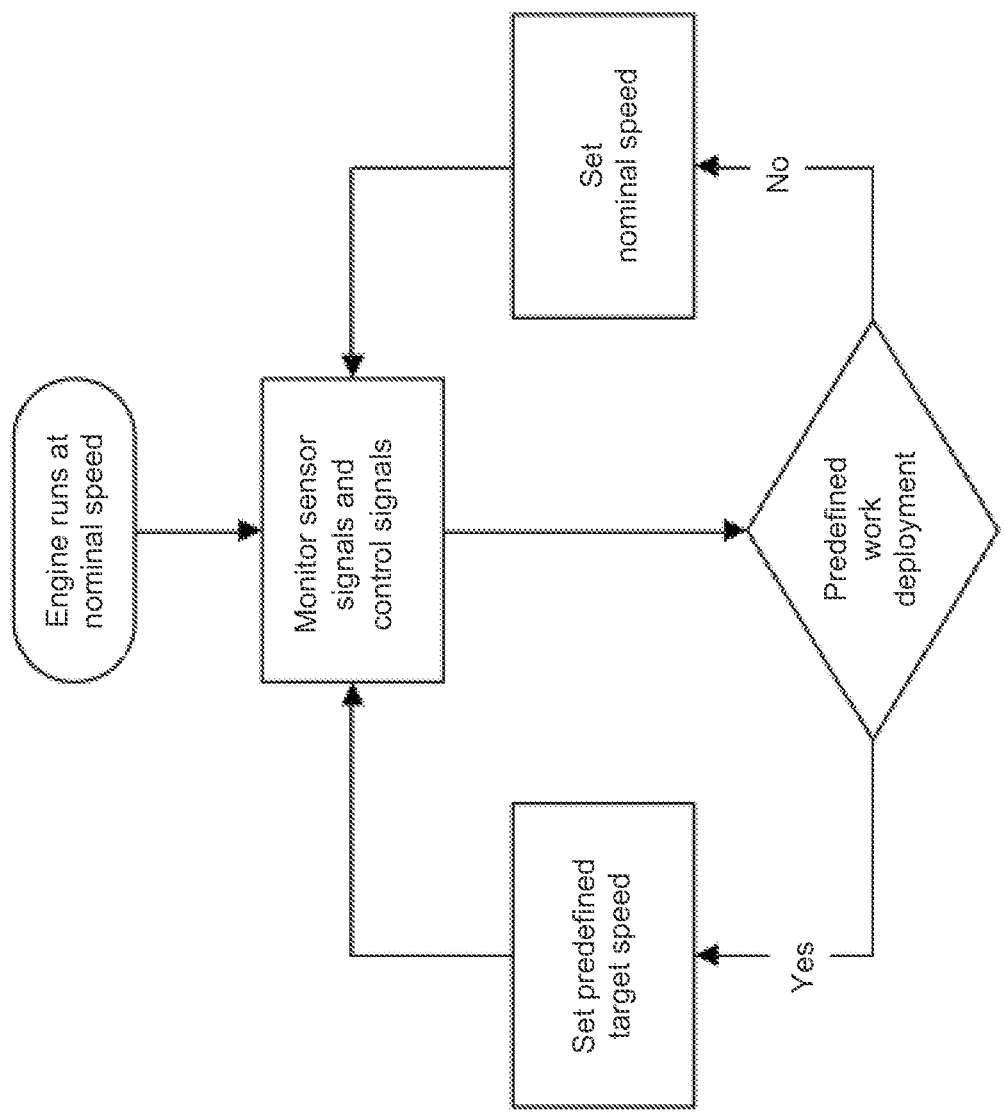
FIG. 4: a flowchart that represents the change of the desired speed of the engine.

FIG. 4 shows a flow change for the method of the present invention. The control device of the machine can here implement the routine then listed.

The flowchart for the change of the desired speed of the engine is shown in FIG. 4. On the start of the machine, the engine is operated at the nominal speed that corresponds to the speed at which the travel speed can be reached that serves as the basis for the configuration of the machine. If now, on the basis of the sensor signals and control signals, an operating mode is recognized that is associated with a previously defined drive speed, the desired speed of the engine is correspondingly influenced. A change back to the nominal speed is made by the continuous monitoring of the work of the machine if no defined operating mode is recognized. It is hereby achieved that the machine can be operated at its nominal starting power with a not previously defined or unrecognized operating mode.

The invention claimed is:
1. A mobile work machine comprising:
an engine for driving the mobile work machine;
a hydraulic power generation unit coupled to the engine and adapted to convey a hydraulic volume in dependence on a speed of the engine; and
a plurality of hydraulic elements actuable by the conveyed volume of the hydraulic power generation unit and associated with different functions of the mobile work machine, and a control device adapted to:
recognize a specific operating mode of the mobile work machine, wherein the control device recognizing the specific operating mode includes the control device detecting the mobile work machine is being operated in the specific operating mode, wherein the specific operating mode comprises an actuation sequence; and
responsive to recognizing the mobile work machine is being operated in the specific operating mode, set a desired speed of the engine in dependence on the recognized specific operating mode.
2. The mobile work machine in accordance with claim 1, wherein the specific operating mode has a fixed cyclic procedure of the actuation sequence of the plurality of hydraulic elements and the control device is adapted to set the desired speed of the engine in dependence on a current cycle phase of the fixed cyclic procedure during a recognized specific operating mode.

3. The mobile work machine in accordance with claim 1, wherein a fixed cyclic routine of the actuation sequence comprises a plurality of cycle phases that can be associated with a work process of the mobile work machine.

4. The mobile work machine in accordance with claim 3, wherein the plurality of cycle phases of the work process comprise digging, lifting, rotating, lifting and rotating, unloading, pivoting back, driving, and/or work preparation.

5. The mobile work machine in accordance with claim 1, wherein at least one respective hydraulic element is associated with digging, lifting, rotating, unloading, pivoting back, and/or driving.

6. The mobile work machine in accordance with claim 1, wherein a transfer case is provided between the engine and the hydraulic power generation unit wherein the transfer case is driven by the engine and drives the hydraulic power generation unit.

7. The mobile work machine in accordance with claim 6, wherein the transfer case has a fixed gear ratio.

8. The mobile work machine in accordance with claim 1, wherein the hydraulic power generation unit outputs a constant volume flow, wherein a starting volume flow is proportional to a drive speed of the hydraulic power generation unit.

9. The mobile work machine in accordance with claim 8, wherein the hydraulic power generation unit has a dividing device to carry out an actuation speed of the plurality of hydraulic elements by a division of the starting volume flow.

10. The mobile work machine in accordance with claim 9, wherein the hydraulic power generation unit has a tank provided for receiving the starting volume flow not required for a supply to the plurality of hydraulic elements.

11. The mobile work machine in accordance with claim 1, wherein the control device is further adapted to operate the engine at a nominal speed provided that the specific operating mode of the mobile work machine has not been recognized.

12. The mobile work machine in accordance with claim 1, further comprising sensors for detecting a state of the different functions of the mobile work machine, wherein a signal from the sensors is provided to the control device together with control signals for the mobile work machine to recognize the specific operating mode of the mobile work machine.

13. A method of operating a mobile work machine, wherein, in the method, via a control device,
   actuation of the mobile work machine is checked for a specific operating mode, the specific operating mode comprising an actuation sequence;
   detecting the specific operating mode;
   if such specific operating mode has been recognized, a desired speed of an engine is set in dependence on the recognized specific operating mode, with the specific operating mode having a fixed cyclic routine of the actuation sequence of a plurality of hydraulic elements of the mobile work machine.

14. The method in accordance with claim 13, wherein furthermore:
   after a start of the mobile work machine, the engine is operated at a nominal speed until the specific operating mode has been recognized and the desired speed of the engine is set in dependence on the recognized specific operating mode; and
   this state is maintained until a different specific operating mode has been recognized so that the desired speed of the engine is set in dependence on the recognized different specific operating mode and/or the specific operating mode has no longer been recognized so that the nominal speed is again set.

15. The method in accordance with claim 13, wherein the specific operating mode of the mobile work machine is characterized by the fixed cyclic routine of the actuation sequence of the plurality of hydraulic elements of the mobile work machine.

16. The method in accordance with claim 15, wherein the fixed cyclic routine of the actuation sequence comprises a plurality of cycle phases that are associated with a work procedure of the mobile work machine.

17. The method in accordance with claim 16, wherein the plurality of cycle phases of the work procedure comprises digging, lifting, rotating, lifting and rotating, unloading, pivoting back, traveling, and/or work preparation.

18. The method in accordance with claim 17, wherein a respective desired speed of the engine is associated with each cycle phase.

19. The method in accordance with claim 15, wherein the desired speed of the engine is set in accordance with a current cycle phase of the fixed cyclic routine during a recognized specific operating mode.

20. A mobile work machine comprising:
   an engine for driving the mobile work machine;
   a hydraulic power generation unit coupled to the engine and adapted to convey a hydraulic volume in dependence on a speed of the engine; and
   a plurality of hydraulic elements actuable by the conveyed volume of the hydraulic power generation unit and associated with different functions of the mobile work machine, and
   a control device configured to recognize a specific operating mode of the mobile work machine; and
   if such a specific operating mode has been recognized, set a desired speed of the engine in dependence on the recognized specific operating mode, with the specific operating mode having a fixed cyclic routine of an actuation sequence of the plurality of hydraulic elements of the mobile work machine.

* * * * *